United States Patent [19]
Ito

[11] Patent Number: 6,144,164
[45] Date of Patent: Nov. 7, 2000

[54] DYNAMIC EL LIGHTING WITH A SINGLE POWER SOURCE

[75] Inventor: Nobuhiro Ito, Tokyo, Japan

[73] Assignees: Fuji Polymertech Co., Ltd.; Polymatech Co., Ltd., both of Tokyo, Japan

[21] Appl. No.: 08/879,176

[22] Filed: Jun. 20, 1997

[30] Foreign Application Priority Data

Jul. 5, 1996 [JP] Japan .................................... 8-195745

[51] Int. Cl.$^7$ .................................................. G09G 3/12
[52] U.S. Cl. ........................ 315/169.3; 345/102; 345/77
[58] Field of Search ............................. 315/169.1, 169.3; 345/45, 77, 102

[56] References Cited

U.S. PATENT DOCUMENTS 4,295,137  10/1981  Haugsjaa .................................... 345/45

FOREIGN PATENT DOCUMENTS 3-278023  12/1991  Japan ...................................... 345/102

*Primary Examiner*—Robert Pascal
*Assistant Examiner*—Justin P. Bettendorf
*Attorney, Agent, or Firm*—McGlew and Tuttle

[57] ABSTRACT

An EL lightening device which can individually switch the luminescence brightness of a plurality of ELs by a single inverter. In this device, a plurality of ELs (3) are connected to the output side of an inverter (1) through AC switches (2) A stabilized DC power supply (4) is connected to the input side of the inverter (1). A control circuit (5) is provided for controlling the lightening of the ELs (3) and is connected to the stabilized DC power supply (4) and the AC switches (2). The control circuit (5) outputs EL lightening signals to control ON/OFF operations of the transfers (2) and also applies an AC voltage to each EL (3) by time division so that said ELs are lightened. At the same time an inverter input voltage control signal is output in accordance with the timing at which the EL is lightened, so that the inverter input voltage of the stabilized DC power supply (4) can be varied.

3 Claims, 12 Drawing Sheets

LUMINESCENCE BRIGHTNESS of the EL
(cd/m²)

LUMINESCENCE BRIGHTNESS of the EL
(cd/m²)

| Numbers of EL lightened | Luminescence brightness [cd/m²] | TOTAL LUMINESCENCE |
|---|---|---|
| 1 | 269.70 | 269.70 |
| 2 | 134.30 | 268.60 |
| 3 | 94.12 | 282.36 |
| 4 | 69.79 | 279.16 |
| 5 | 57.13 | 285.50 |

| INPUT VOLTAGE of INVERTER (DC V) | BRIGHTNESS of EL LUMINESCENCE (cd/㎡) |
|---|---|
| 3 | 18.1 |
| 4 | 32.2 |
| 5 | 45.7 |
| 6 | 60.1 |

Luminescence Brightness

| Load is not connected | Load is connected |
|---|---|
| 39.2 (cd/cm²) | 19.2 (cd/cm²) |

FIG. 17
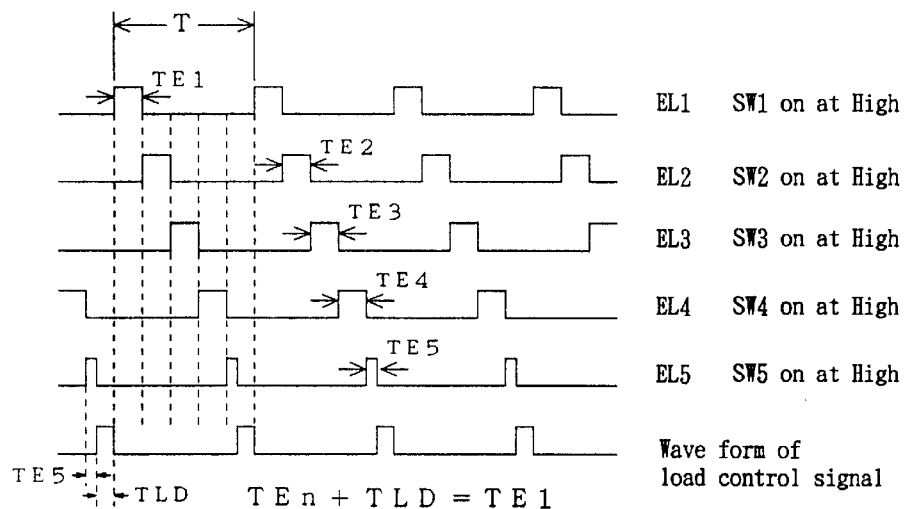
FIG. 18
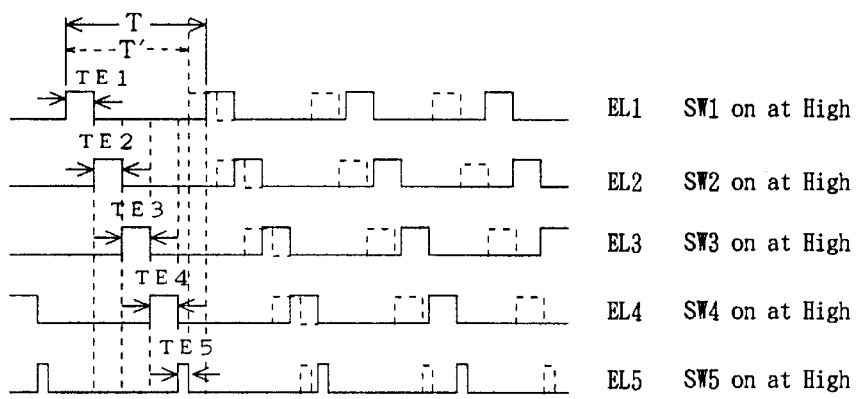
FIG. 19
| Applied voltage time | Normal (5 m/sec) | Shorter (2 m/sec) |
|---|---|---|
| Luminescence Brightness | 60.8 cd/㎡ | 21.5 cd/㎡ |

DYNAMIC EL LIGHTING WITH A SINGLE POWER SOURCE

TECHNICAL FIELD

The present invention relates to an electro-luminescence cell (hereinafter referred to as EL) lightening device that individually transfers and lightens the luminescence brightness of a plurality of electro-luminescence cells.

This EL lightening device applies to the following device and units:

(1) Display device which uses a plurality of ELs arranged on a sheet or a plurality of independent ELs as a back light and which individually transfers and lightens the luminescence brightness of each EL by lightening or darkening ELs on portions which are emphasized in order to make a display comprehensible.

(2) Key input unit which lays ELs under semitransparent keys and normally lightens the ELs with low brightness so that they can be manipulated even in darkness and which, if a key is depressed, lightens the EL under the depressed key with high brightness so that the depressed key can be confirmed.

(3) Key input unit as described in the previous part which normally lightens ELs with high brightness and, if a key is depressed, transfers the brightness of the depressed key to low brightness.

(4) Key input unit which displays a current manipulated state by the luminescence brightness of ELs laid under keys.

BACKGROUND OF THE PRESENT INVENTION

A light emitting diode (LED), a cold cathode tube, and an EL are employed as a luminous element for illumination, but the LED and the cold cathode tube are thick in width. Therefore, if these elements are employed in a display device or an input unit, the depth will become deep.

In additions it is difficult for these elements to be uniformly illuminant, depending on the shape and the size of the illuminant surfaces and consequently, an uneven illuminance sometimes arises.

For this reasons ELs are frequently used as a luminous element which is a thin type and which is evenly illuminant regardless of the shape and the size of the illuminant surface.

This EL, as shown in FIG. 1, is connected to a power supply (inverter) for lightening an EL which converts a DC power to an AC powers and the EL is lightened by an AC voltage of typically 200 to 400 V (P—P).

As one of the methods which individually switch the luminescence brightness of a plurality of ELs, there is a method which varies the input voltage of an inverter connected to each EL.

As shown in FIG. 2, if the input voltage of the inverter is made high, the amplitude of an AC voltage that is applied to an EL becomes large as shown in FIG. 3 and the EL is brightly luminant.

Conversely, if the input voltage of the inverter is made low, the amplitude of an AC voltage that is applied becomes small and the EL is darkly luminant.

In FIG. 4 there is shown the relationship between the input voltage of the inverter and the luminescence brightness of the EL.

In FIG. 2, since the input voltages of the inverters connected to an EL1 and an EL3 are higher than the input voltage of the inverter connected to an EL2, AC voltages that are applied to the EL1 and the EL3 are higher than the AC voltage that is applied to EL2, so that the EL1 and the EL3 are more brightly luminant than the EL2.

However, if the luminescence brightnesses of a plurality of ELs are individually transfered with the aforementioned methods inverters corresponding in number to ELs will be needed and therefore the structure will be very uneconomical.

SUMMARY AND OBJECTS OF THE INVENTION

Accordingly, the primary objective of the present invention is not to connect an inverter to each EL to switch the luminescence brightnesses of the individual ELs but to make it possible to individually switch the luminescence brightness of a plurality of ELs by a single inverter.

To achieve the aforementioned objective, the present invention is constructed as follows.

That is, an EL lightening device comprises:

a plurality of ELs connected to a single power supply for lightening ELs;

dynamic lightening means for dynamically lightening the plurality of ELs by sequentially scanning a plurality of lightening signals with time division; and EL luminescence brightness switching means for individually switching the luminescence brightnesses of the plurality of ELs in accordance with the timing at which the scanning is performed.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

The present invention will be described in further detail with reference to the accompanying drawings, in which:

FIG. 17 is a waveform diagram of EL lightening signals which vary the voltage applying time of an EL and a load control signal;

FIG. 18 is a waveform diagram of EL lightening signals when no load control signal is present;

FIG. 19 is a graph showing the luminescence brightness obtained when the voltage applying time of the EL is normal and when it is made shorter.

DESCRIPTION OF THE PREFERRED EMBODIMENT

The first description will be made of an EL lightening device which varies an applied voltage of an EL as an EL luminescence brightness transfer(switching) means to carry out the present invention.

Figure 1:
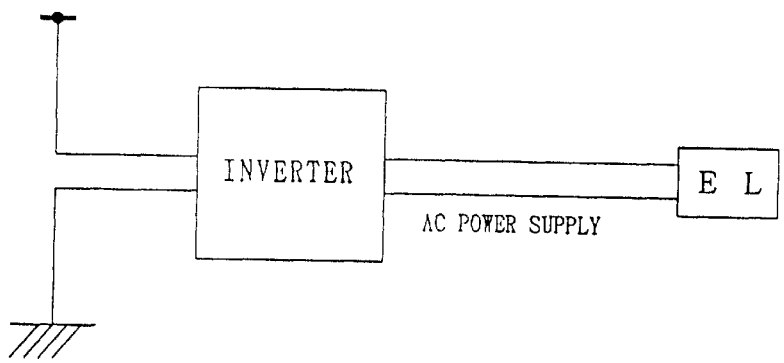
FIG. 1 is a diagram of the connection between an EL lightening power supply and an EL.
Figure 2:
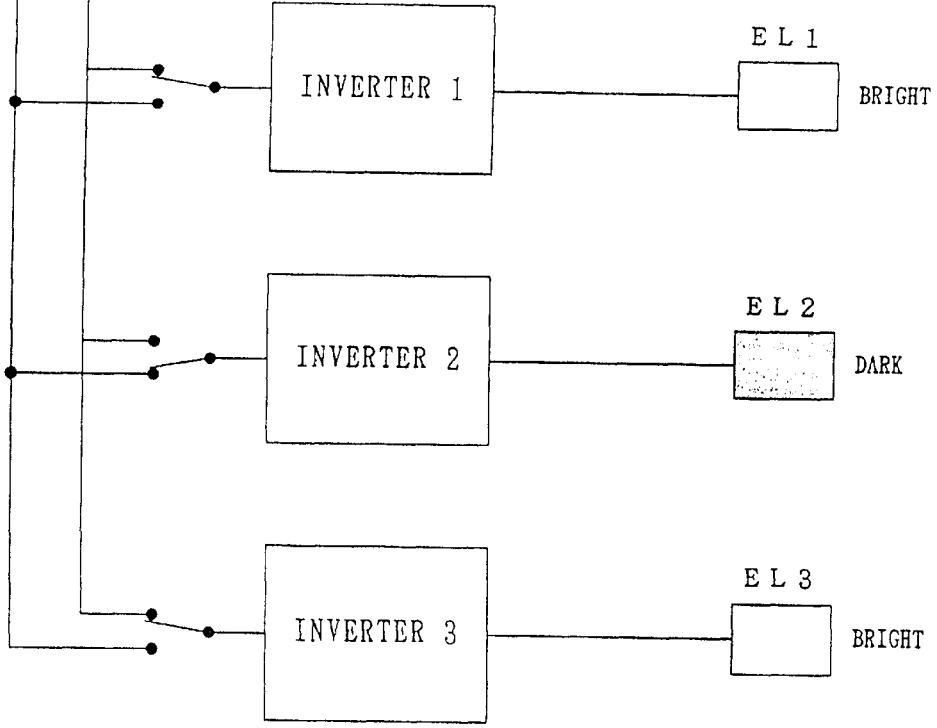
FIG. 2 is a diagram of the connection between an EL lightening power supply and ELs, which individually switch the luminescence brightnesses of the ELs.
Figure 3:
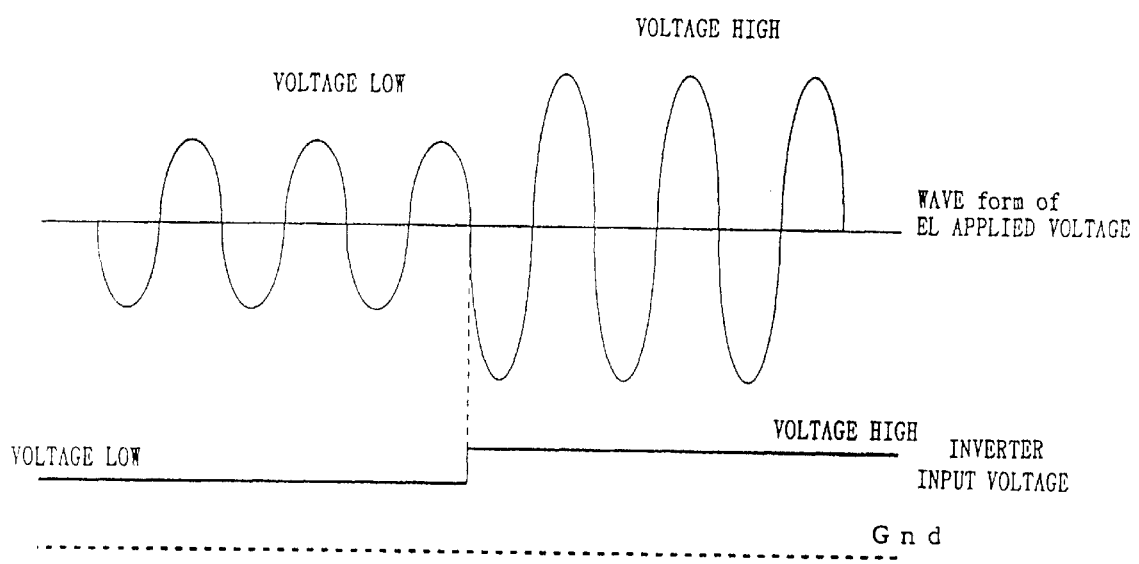
FIG. 3 is a waveform diagram of the input voltage of an inverter and the AC voltage which is applied to an EL.
Figure 4:
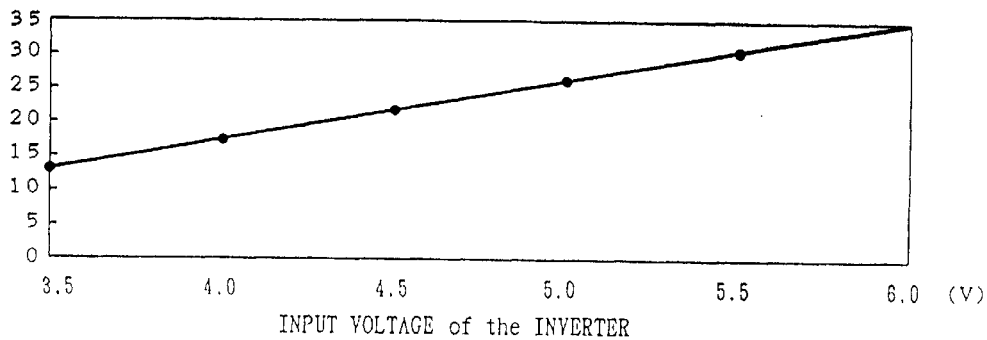
FIG. 4 is a graph showing the relationship between the input voltage of the inverter and the luminescence brightness of the EL.
Figure 5:
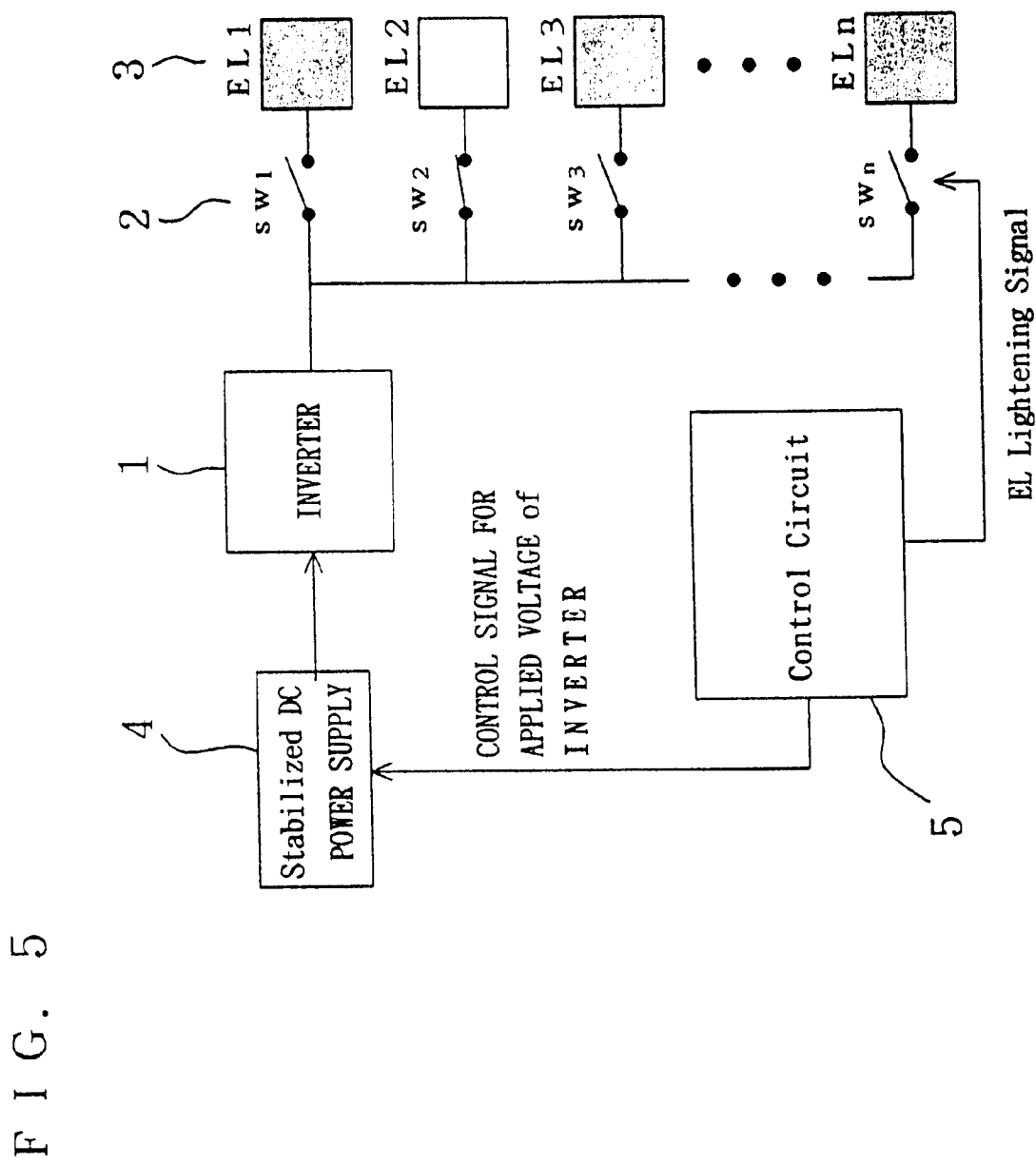
FIG. 5 is a block diagram of an EL lightening device which varies a voltage that is applied to the EL.

In FIG. 5 there is a block diagram of this EL lightening device.

In the EL lightening device, a plurality of ELs (3) are connected to the output side of a single inverter (1) through AC switches (2).

The input side of the inverter (1) is connected to a stabilized DC power supply (4). A control circuit (5) is provided for controlling the lightening of the ELs (3) and is connected to the stabilized DC power supply (4) and the AC swiches (2).

The EL lightening device sequentially scans EL lightening signals by time division so that the AC switches (2) can be turned on and off.

This arrangement makes possible the dynamic lightening which supplies AC power from a single inverter (1) to a plurality of ELs (3) in a time-division manner and which lightens the ELs (3).

Figure 6:
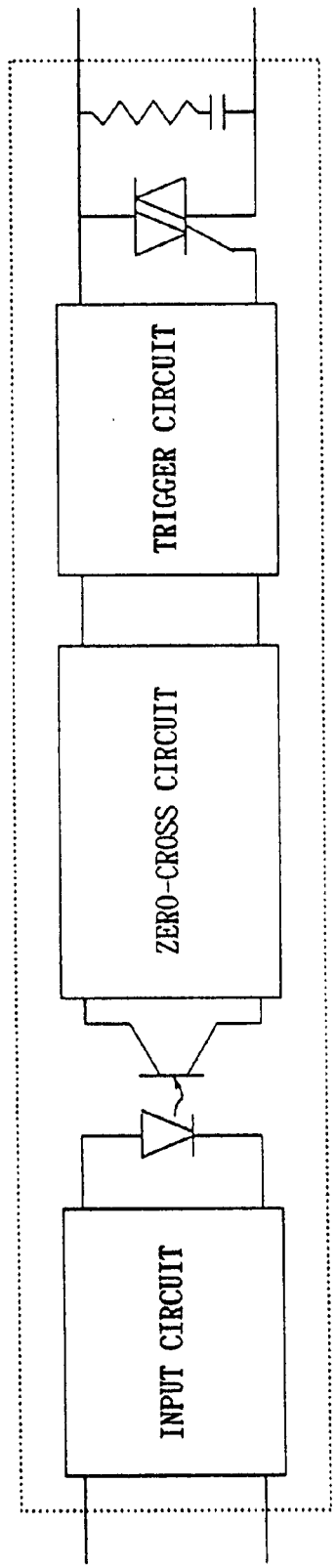
FIG. 6 is an inner structural diagram of an AC switch.

The AC switch (2) is a semiconductor relay circuit employing a TRIAC, as shown in FIG. 6. To reduce electromagnetic noises the main circuit incorporates a zero-cross circuit which is closed at the zero-cross point of a supply voltage, and a photocoupler connection which electrically insulates a control signal from the main circuit is made.

Figures 7, 8:
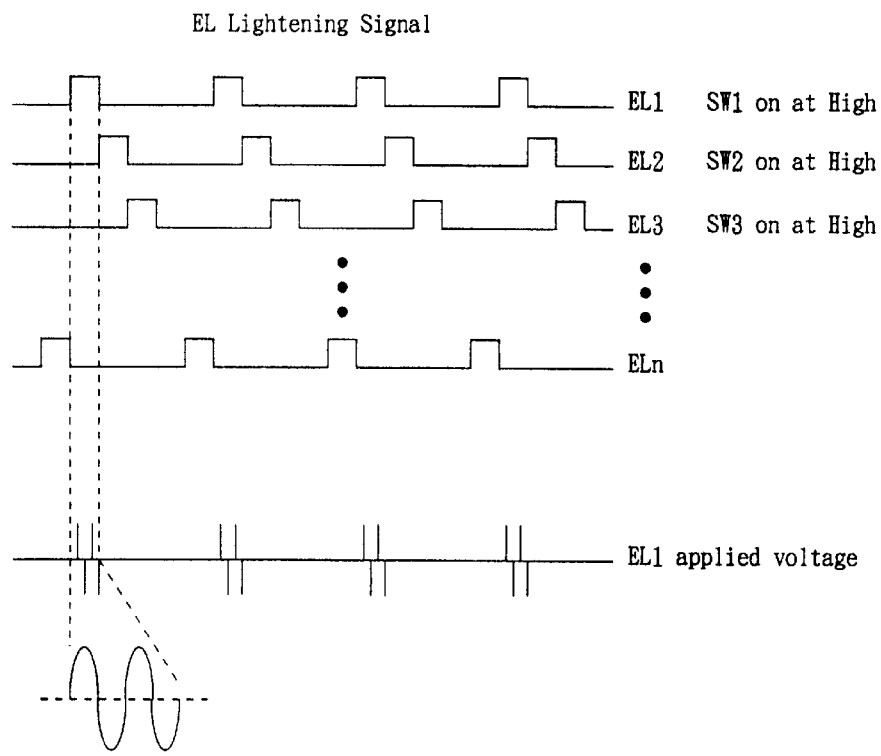
FIG. 7 is a waveform diagram of a control signal which varies a voltage that is applied to an EL.
FIG. 8 is a table showing the relationship between the number of ELs which are lightened with time division and the luminescence brightness.

In FIG. 7 there are shown the waveforms of the EL lightening signals which turn the AC switches (2) on and off and the waveform of the AC voltage that is applied to the ELs (3).

When the EL lightening signal is at a high level, the trigger current of the AC switch (2) flows and the TRIAC is turned on. An AC voltage is applied to the EL (3) connected to this AC switch (2), and the EL(3) is lightened For the EL lightening signals, each EL lightening signal has high and low levels so that, at a certain point, only one of the AC switches (2) corresponding to the ELs (3) is turned on and the remaining AC switches (2) are all turned off.

The ON/OFF operations of all AC switches (2) are performed once during one cycle.

Since the ON/OFF operations of the AC switches (2) are performed cyclically at high speed, all ELs (3) look like they have been lightened at all times to the human eye.

Normally, the inverter (1) applies voltage to the ELs (3) by time divisions so it requires a large capacity.

As shown in an equation. (luminescence brightness of ELs (3) which are lightened with time division)= (luminescence brightness of a single EL (3) which is lightened)/(number of ELs (3) which are lightened), the luminescence brightness of ELs (3) which are lightened with time division is reduced in proportion to the number of ELs (3) which are lightened, as compared with a single EL (3) which is lightened.

In FIG. 8 there is shown the relationship between the number of ELs (3) which are lightened with time division and the luminescence brightness As evident in the figure, when the ELs (3) are lightened with time division, a large capacity inverter (1) is needed as compared with the luminous area of each EL (3).

In the present invention, the stabilized DC power supply (4) is constituted by a switching regulator IC so that the output voltage is variable, and the output voltage is controlled by an inverter input voltage control signal.

The control circuit (5) is constituted by a one-chip CPU and outputs both the aforementioned EL lightening signal which controls the ON/OFF operations of the AC switches (2) by a program and the aforementioned inverter input voltage control signal which controls the output voltage of the stabilized DC power supply (4).

The EL lightening device which varies the applied voltage of the EL to execute the present invention is constituted as described above, and the control circuit (5) outputs the EL lightening signal to control the ON/OFF operations of the AC switches (2). The control circuit (5) also applies an AC voltage from the inverter (1) to each of the ELs (3) by time division to light the ELs (3).

At the same time, the inverter input voltage control signal is output in accordance with the timing at which the ELs are lightened, so that the inverter input voltage of the stabilized DC power supply (4) is varied.

In this way, the output voltage of the inverter (1) is varied and the luminescence brightness of the EL is transfered.

Figures 9, 10:
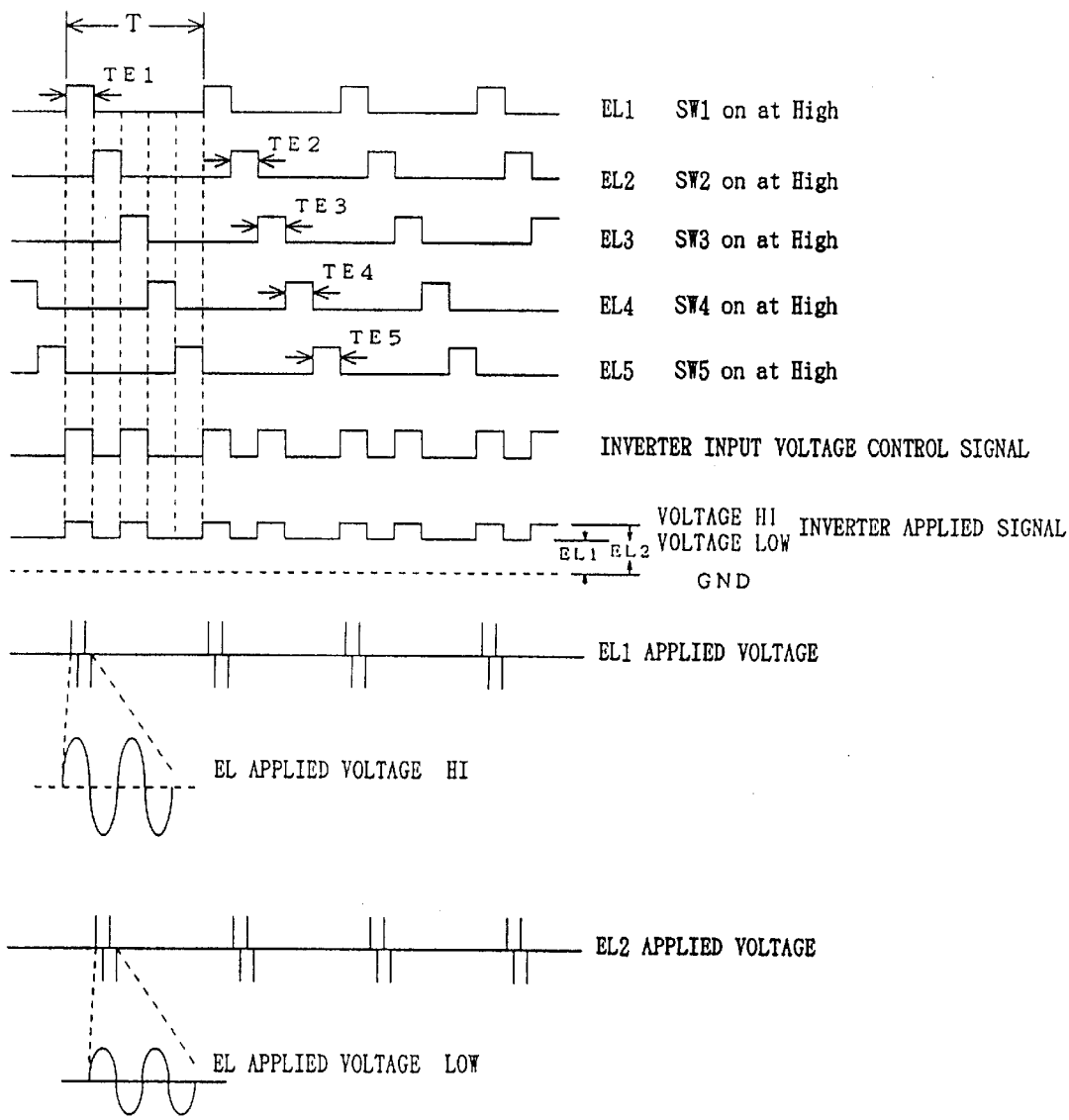
FIG. 9 is a waveform diagram of an EL lightening signal and an inverter input voltage control signal.
FIG. 10 is a table showing the relationship of the luminescence brightness of the EL to the input voltage of the inverter.

In FIG. 9 there are shown the waveforms of the EL lightening signals and the waveform of the inverter input voltage control signal.

The control circuit (5) makes the EL lightening signal high to turn on the AC switch (2). With this, the output voltage of the inverter (1) is applied to the EL (3) connected to this AC switch (2), and the EL (3) is lightened At this time, the inverter input voltage control signal is simultaneously made high or low to control the output voltage of the inverter (1).

If the inverter input voltage control signal is made high, the output voltage of the inverter (1) will go to a high voltage and therefore the EL (3) will be lightened with high brightness. If, on the other hand, the inverter input voltage control signal is made low, the output voltage of the inverter (1) will go to a low voltage and therefore the EL (3) will be lightened with low brightness.

As shown in FIG. 9, the EL1 and the EL3 are lightened with high brightness and the EL2, the EL4, and the EL5 are lightened with low brightness.

The scanning cycle of the ELs (3) is taken to be $T$ and the lightening time of each EL (3) during this $T$ is taken to be TE. If T is made longer, the ELs (3) will frequently flicker, and if TE is made shorter, the ELs (3) will not be lightened.

In the case where five ELs (3) are connected to a single inverter (1), T=20 ms and TE=T/5 (number of ELs)=4 ms are appropriate as the standard when the applied voltage of the EL (3) is varied to switch the luminescence brightness of the EL (3).

In this case the lightening times of the ELs (3) need to be uniformly set. If the lightening times are not uniform, the ELs (3) will be nonuniform in brightness In FIG. 10 there is the relationship between the input voltage of the inverter (1) and the luminescence brightness of the EL (3).

Figure 11:
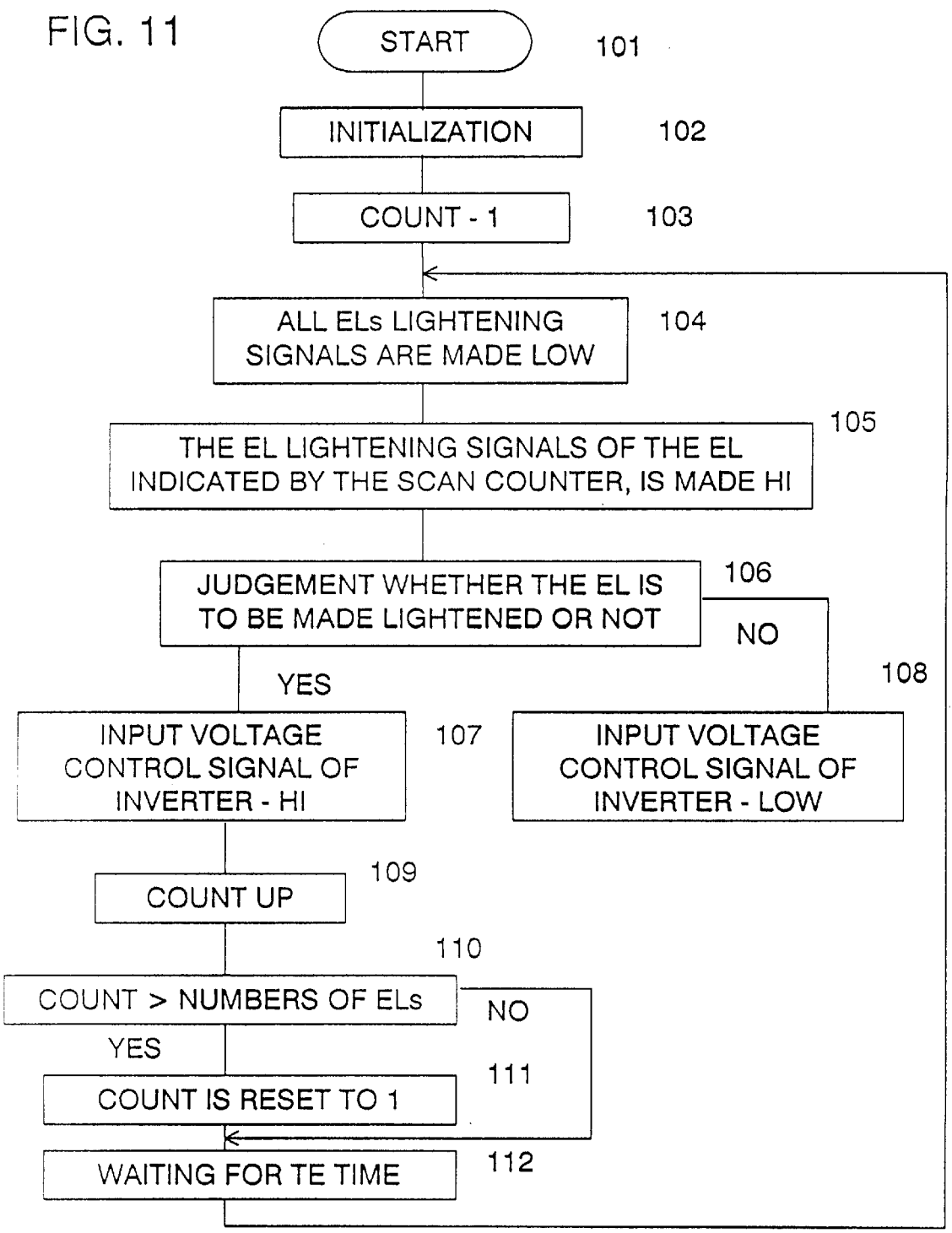
FIG. 11 is a flowchart of the process in a control circuit which varies a voltage that is applied to an EL.

In reference to a flowchart shown in FIG. 11, a description will be made of the process in the control circuit (5) which varies a voltage that is applied to the EL (3).

If the process is started (step 101), a 1 is set to a scan counter (step 103) after initialization (step 102).

Next, all EL lightening signals are made low (step 104), and the EL lightening signal of the EL (3), indicated by the scan counter, is made high. (step 105).

At this time, it is judged whether this EL (3) is lightened or not (step 106). When the EL (3) is lightened, the inverter input voltage control signal is made high (step 107), and when it is darkened, the inverter input voltage control signal is made low (step 108).

Next, the count value of the scan counter is incremented (step 109). Then, it is judged whether the count value has exceeded the number of ELs (3) which are lightened (step 110). When the count value exceeds the number of ELs (3), the scan counter is reset to a 1 (step 111).

After TE time (EL lightening time), the process returns to step 104 (step 112).

The second description will be made of an EL lightening device which connects a load in parallel with ELs as an EL luminescence brightness transfer means to carry out the present invention.

Figure 12:
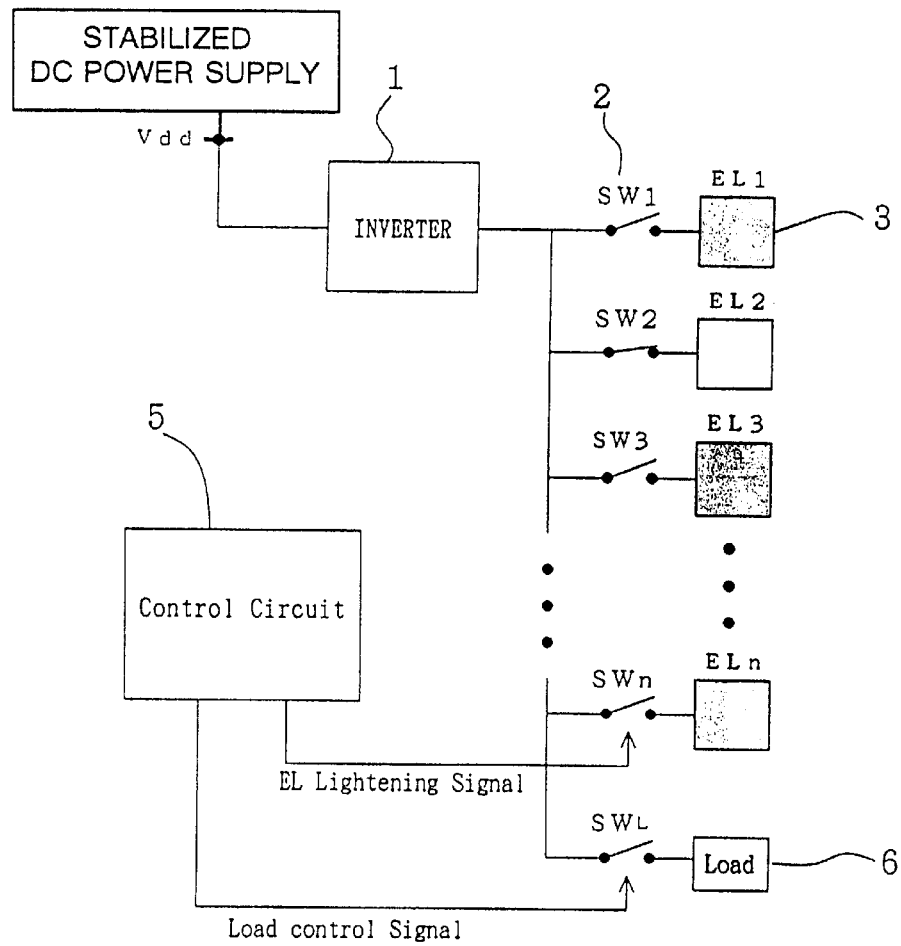
FIG. 12 is a block diagram of an EL lightening device which connects a load in parallel with ELs.

In FIG. 12 there is shown a block diagram of this EL lightening device.

In the EL lightening device, a plurality of ELs (3) and a load (6) are connected to the output side of an inverter (1) through AC switches (2). A control circuit (5) is provided to control the ON/OFF operations of the ELs (3) and is connected to the AC switches (2).

The EL lightening device, which connects a load in parallel with ELs and carries out the present invention, is constructed as described above, and the control circuit (5) outputs EL lightening signals to control the ON/OFF operations of the AC switches (2) and also applies an AC voltage to each EL (3) by time division to light each EL (3). At the same time, the control circuit (5) outputs a load control signal in accordance with the timing at which the EL is lightened, to turn on and off the AC switches (2) connected to the load (6) and vary the load connected to the inverter (1).

Figure 13:
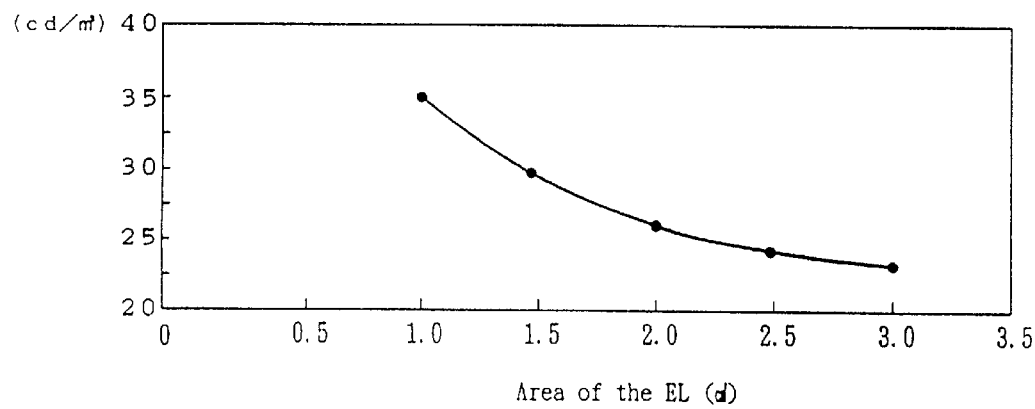
FIG. 13 is a graph showing the relationship between the area of the EL and the luminescence brightness.

As shown in FIG. 13 if the load (the area of the EL (3)) connected to the inverter (1) is varied, the luminescence brightness of the EL (3) is also varied.

In this way, by intermittently varying the load in parallel with the EL, the luminescence brightness of the EL can be transfered.

Figures 14, 15:
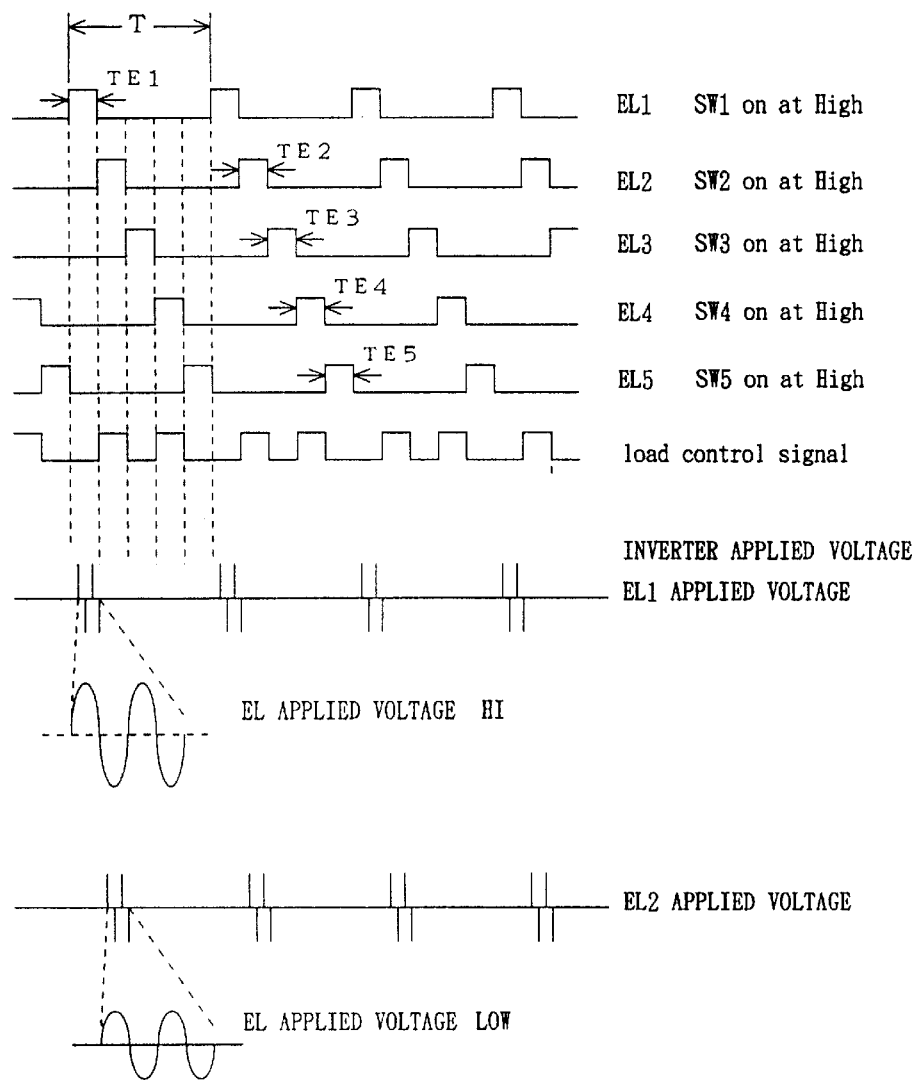
FIG. 14 is a waveform diagram of EL lightening signals which connect a load in parallel with ELs and a load control signal.
FIG. 15 is a graph showing the luminescence brightness obtained when a load is connected and when it is not connected.

In FIG. 14 there are shown the waveforms of the EL lightening signals and the waveform of the load control signal.

The control circuit (5) makes an EL lightening signal high to turn on one of the AC switches (2) and then applies the output voltage of the inverter (1) to the EL (3) connected to this AC switch (2) to light the EL (3).

At this time, the load control signal is simultaneously made high or low to intermittently vary the load connected to the inverter (1).

If the load control signal is made high, the AC switch (2) connected to the load (6) will be turned on and the output voltage of the inverter (1) will be applied to the load (6) at the same time as the EL (3) lightening.

Thus, when the EL (3) and the load (6) are connected in parallel, the EL (3) is darkly lightened, and when the load (6) is not connected to the EL (3), the EL (3) is brightly lightened.

In FIG. 14, when the EL lightening signals of the EL2 and the EL4 are high, the load control signal is high and therefore the EL2 and the EL4 are darkly lightened. On the other hand, when the EL lightening signals of the EL1, the EL3, and the EL5 are high, the load control signal is low and therefore the EL1, the EL3, and the EL5 are brightly lightened.

In FIG. 15 there is shown the luminescence brightness of the EL (3) obtained both when the load (6) is connected to the EL (3) in the aforementioned way and when it is not connected.

As with the aforementioned embodiment, if the scanning cycle T of the ELs (3) is made longer, the ELs (3) will frequently flicker, and if the lightening time TE of each EL (3) is made shorter, the ELs (3) will not be lightened.

In the case where five ELs (3) are connected to a single inverter (1), T=20 ms and TE=T/5 (number of ELs (3))=4 ms are appropriate as the standard when the EL (3) and the load (6) are connected in parallel to switch the luminescence brightness of the EL (3).

In this case the lightening times of the ELs (3) need to be uniformly set. If the lightening times are not uniform, the ELs (3) will be nonuniform in brightness.

Figure 16:
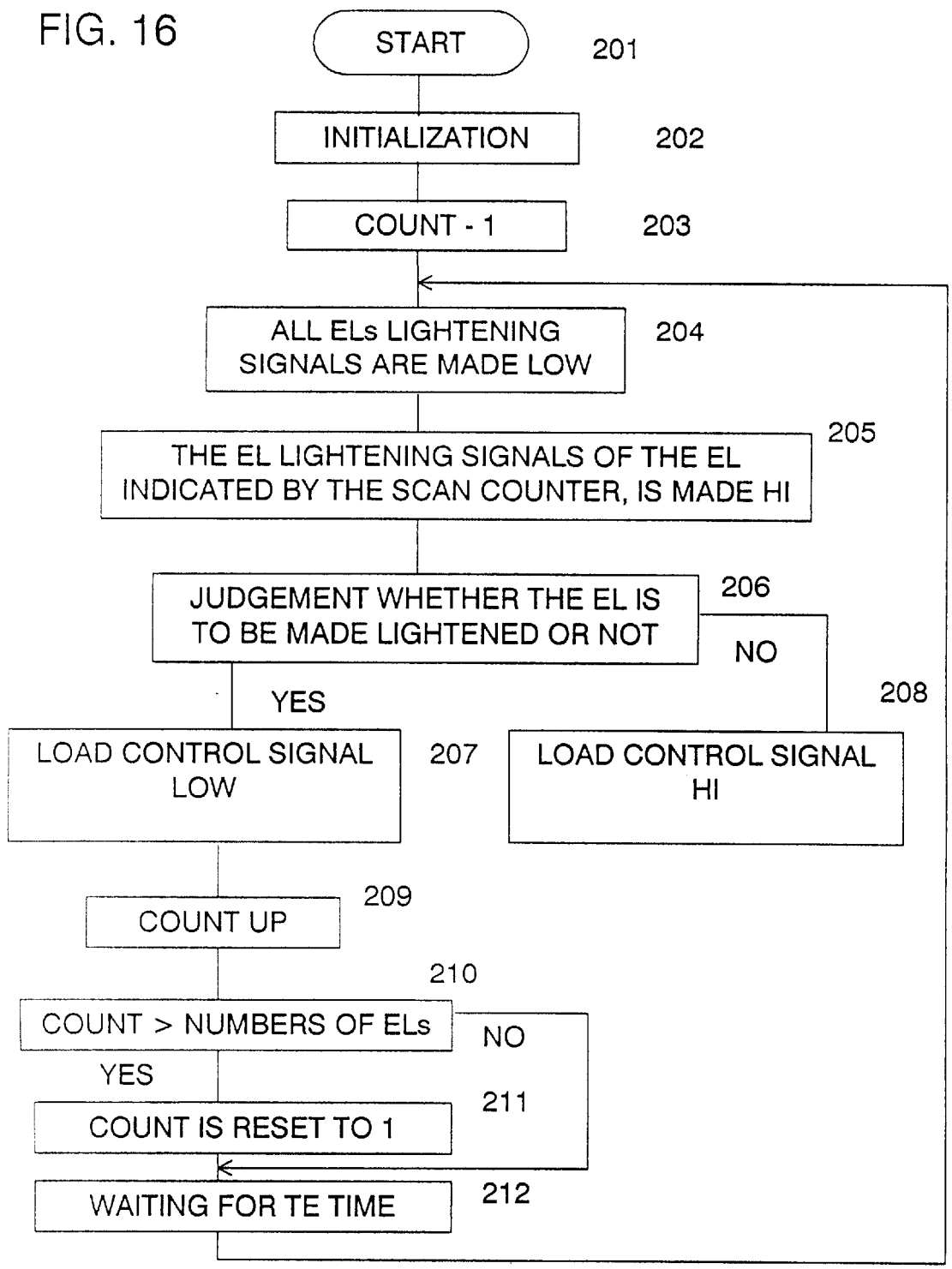
FIG. 16 is a flowchart of the process in a control circuit which connects a load in parallel with ELs.

In reference to a flowchart shown in FIG. 16, a description will be made of the process in the control circuit (5) which connects the load (6) in parallel with the EL (3).

If the process is started (step 201), a 1 is set to a scan counter (step 203) after initialization (step 202).

Next, all EL lightening signals are made low (step 204), and the EL lightening signal of the EL (3), indicated by the scan counter, is made high (step 205).

At this time, it is judged whether this EL (3) is lightened or not (step 206). When the EL (3) is lightened, the load control signal is made low (step 207), and when it is darkened, the load control signal is made high (step 208).

Next, the count value of the scan counter is incremented (step 209). Then, it is judged whether the count value has exceeded the number of ELs (3) that are lightened (step 210). When the count value exceeds the number of ELs (3), the scan counter is reset to a 1 (step 211).

After TE time (EL lightening time), the process returns to step 204 (step 212).

The third description will be made of an EL lightening device which varies the voltage applying time of an EL as an EL luminescence brightness switching means to carry out the present invention.

A block diagram of this EL lightening device is the same as the block diagram of FIG. 12 which shows the EL lightening device connecting a load in parallel with ELs.

Therefore, as with the EL lightening device of FIG. 12, a plurality of ELs (3) and a load (6) are connected to the output side of an inverter (1) through AC switches (2). A control circuit (5) is provided to control the lightening of the ELs (3) and is connected to the AC switches (2).

The EL lightening device, which varies the voltage applying time of an EL to carry out the present invention, is constructed as described above, and the control circuit (5) outputs EL lightening signals to control the ON/OFF operations of the AC switches (2) and also applies an AC voltage to each EL (3) by time division to light each EL (3)

At the same time, in accordance with the Liming at which the EL is lightened the control circuit (5) varies the time during which an AC voltage is applied to the EL (3).

In FIG. 17 there are shown the waveforms of the EL lightening signals and the waveform of the load control signal.

The control circuit (5) makes an EL lightening signal high to turn on one of the AC switches (2) and then applies the output voltage of the inverter (1) to the EL (3) connected to this AC switch (2) to light the EL (3).

At this times in the case where the EL5 is darkly lightened, the time during which an AC voltage is applied to the EL5 is made shorter and the load control signal is made high during time TLD shorter than the voltage applying times TE1 through TE4 of the ELs 1 through 4 which are normally lightened. With this condition, the load (6) is connected to the inverter (1).

If the load control signal is made highs the AC switch (2) connected to the load (6) will be turned on and the output voltage of the inverter (1) will be applied to the load (6).

If the voltage applying time of the EL (3) is shortened, the luminescence brightness of the EL (3) will be reduced As shown in FIG. 8, if ELs (3) are increased in number, the luminescence brightness of each EL (3) will be reduced. This fact has indicated that if ELs (3) are increased in number, the voltage applying time of each EL (3) will be shortened and therefore the luminescence brightness of the EL (3) will be reduced.

In FIG. 17, the time during of which the EL lightening signal of the EL5 is high, is shorter than the time during of which other EL lightening signals are high, so the luminescence brightness of the EL5 becomes lower than those of EL1, EL2, EL3, and EL4.

Thus, if the time during of which the EL lightening signal of the EL5 is high is made shorter than the time during of which other EL lightening signals are high, the luminescence brightness of the EL5 can be made lower.

However, as shown in FIG. 18, if the EL lightening signal of the EL5 is made low and the EL lightening signal of the immediately following EL1 is made high, then the lightening time TE of the EL5 will be shorter than the lightening time TE of each of the EL1, the EL2, the EL3, and EL4.

The relationship between the luminescence brightness of the EL (3) that is lightened with time division and the time TE during of which voltage is applied to each EL (3) can be expressed as:

Luminescence brightness=(luminescence brightness when a single EL (3) is lightened)=TE/scanning cycle T For this reasons if the EL lightening signal of EL5 goes low and the EL lightening signal of the immediately following ELI is made high, the scanning cycle $T$ will be $T'$ as shown in FIG. 18. Therefore, the lightening time TE of each EL (3) will be varied and the Luminescence brightness will also be varied.

Therefore, to make all lightening times TE equal to each other, the voltage applying time TE5 of the EL5 must be added to the time TLD during of which no voltage is applied, that is,

TE5+TLD=TE1=TE2=TE3=TE4

During this TLD, unless the load (6) is connected to the output of the inverter (1), the oscillation of the inverter (1) will be unstable.

In FIG. 19 there is shown the luminescence brightness of the EL (3) obtained both when the voltage applying time TE of the EL (3) is normal and when the TE is shortened.

As with the aforementioned embodiment, if the scanning cycle T of the ELs (3) is made longer, the ELs (3) will frequently flicker, and if the lightening time TE of each EL (3) is made shorter, the ELs (3) will not be lightened.

In the case where 5 ELs (3) are connected to a single inverter (1), T=25 ms, TE=T/5 (number of ELs (3))=5 ms, and TLD=3 ms are appropriate as the standard when the voltage applying time TE of the EL (3) is varied to switch the luminescence brightness of the EL (3).

At this time, the voltage applying time of the EL (3) that is darkly lightened becomes 2 ms.

In this case the lightening times TE of the ELs (3) need to be uniformly set. If the lightening times TE are not uniform, the ELs (3) will be ununiform in brightness.

Figure 20:
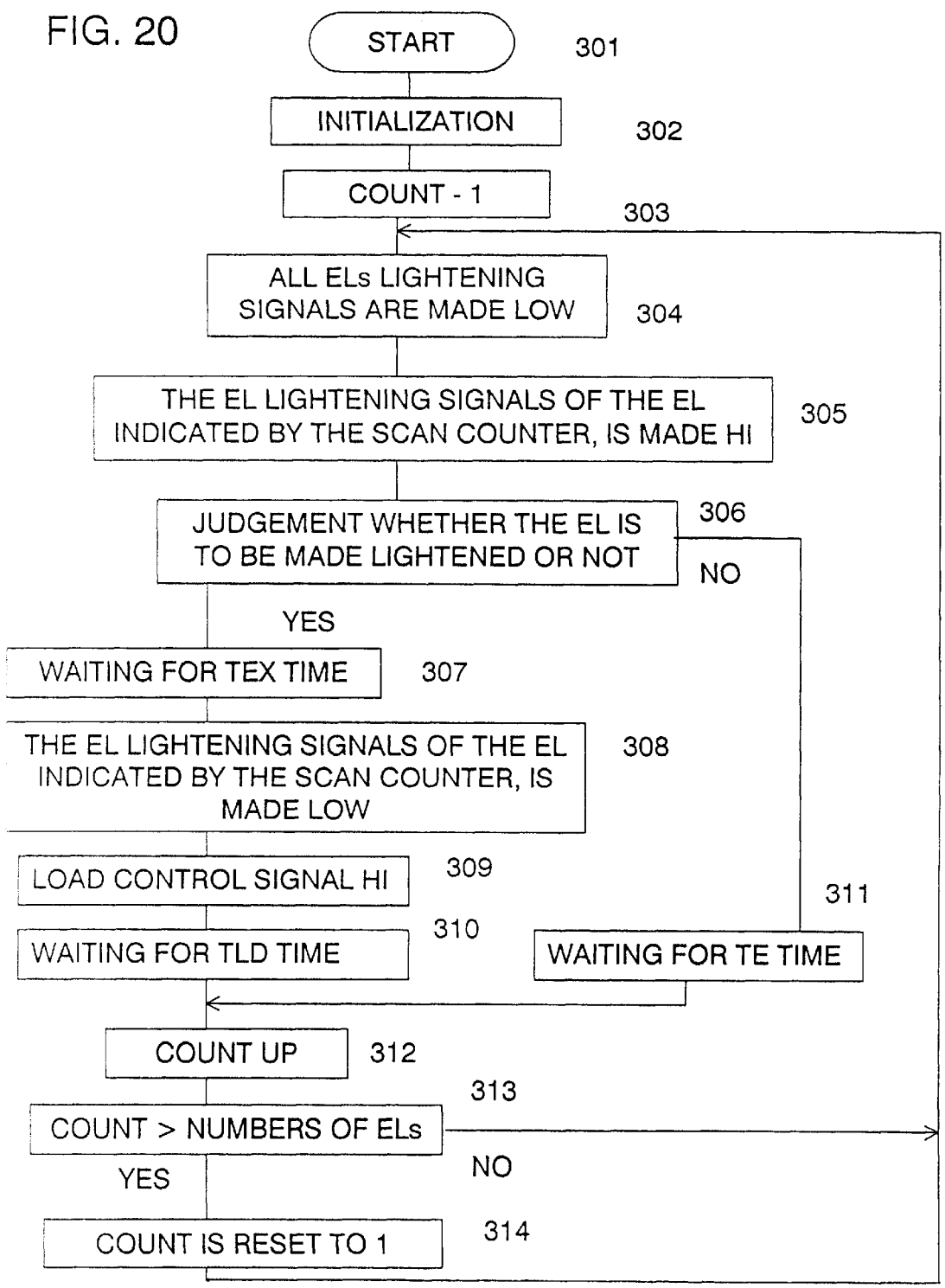
FIG. 20 is a flowchart of the process in a control circuit which varies the voltage applying time of the EL.

In reference to a flowchart shown in FIG. 20, a description will be made of the process in the control circuit (5) which varies the voltage applying time of the EL (3).

If the process is started (step 301), a 1 is set to a scan counter (step 303) after initialization (step 302).

Next, all EL lightening signals are made low (step 304), and the EL lightening signal of the EL (3), indicated by the scan counter, is made high (step 305).

At this time, it is judged whether this EL (3) is darkened or not (step 306). When the EL (3) is darkened, the EL lightening signal of this EL (3) is made low (step 308) after TEX time (EL lightening time when the EL (3) is darkened) (step 307).

Next, the load control signal is made high (step 309) and TLD time (load applying time) elapses (step 310).

When this EL (3) is not darkened, TE time (normal EL lightening time) elapses (step 311).

After the elapse of the TLD time or TE time, the count value of the scan counter is incremented (step 312). Then, it is judged whether the count value has exceeded the number of ELs (3) that are lightened (step 313). When the count value exceeds the number of ELs (3), the scan counter is reset to a 1 and the process returns to step 304 (step 314).

INDUSTRIAL APPLICABILITY

Hitherto, when the luminescence brightnesses of a plurality of ELs are individually transfered and the ELs are lightened inverters corresponding in number to the ELs have been needed.

The EL lightening device of the present invention lightens a plurality of ELs with time division and individually transfers the luminescence brightness of each EL in accordance with the timing at which the EL is lightened.

Therefore the present invention does not connect a plurality of inverters to the EL to switch the luminescence brightness of each EL but is able to individually switch the luminescence brightnesses of a plurality of ELs by a single inverter.

For this reason, circuit fabrication cost is reduced and circuit board size becomes smaller, so a reduction in the cost of the device and a reduction in the size can be achieved.

In addition, since the luminescence brightnesses of a plurality of ELs can be individually transfered, the displayed content and the manipulated state of a display device or a key input unit can be visually expressed.

Furthermore, by using ELs as the back light of a display device or a key input unit, an even illumination becomes possible as compared with LEDs and cold cathode tubes, and a display portion and a key input portion can be made thinner.

While specific embodiments of the invention have been shown and described in detail to illustrate the application of the principles of the invention, it will be understood that the invention may be embodied otherwise without departing from such principles.

I claim:

1. An electroluminescence cell lightening device comprising:

a single power supply for lightening an electroluminescence cell (EL);

a plurality of ELs connected to said single power supply;

dynamic lightening means for dynamically lightening said plurality of ELs by sequentially scanning a plurality of lightening signals with time division, said dynamic lightening means connects said plurality of ELs to an output side of a single inverter through AC switches, also connects a stabilized DC power supply to an input side of said inverter, and further provides a control circuit for controlling the lightening of the ELs;

said control circuit is connected to said stabilized DC power supply and said AC switches, and said control circuit outputs EL lightening signals to control ON/OFF operations of said AC switches and also applies an AC voltage to each EL by time division so that said ELs are lightened; and EL luminescence brightness switching means for individually switching the luminescence brightness of said plurality of ELs in accordance with the timing at which said scanning is performed, said EL luminescence brightness switching means outputs an inverter input voltage control signal in accordance with the timing at which the EL is lightened so that the inverter input voltage of said stabilized DC power supply is varied.

2. An electroluminescence cell lightening device comprising:

a single power supply for lightening an electroluminescence cell (EL);

a plurality of ELs connected to said single power supply;

dynamic lightening means for dynamically lightening said plurality of ELs by sequentially scanning a plurality of lightening signals with time division, said dynamic lightening means connects said plurality of ELs to an output side of a single inverter through AC switches, and further provides a control circuit for controlling the lightening of the ELs;

said control circuit is connect to said AC switches, and said control circuit outputs EL lightening signals to control ON/OFF operations of said AC switches and also applies an AC voltage to each EL by time division so that said ELs are lightened; and EL luminescence brightness switching means for individually switching the luminescence brightness of said plurality of ELs in accordance with the timing at which said scanning is performed, said EL luminescence brightness switching means varies the time during which said AC voltage is applied, in accordance with the timing of said dynamic lightening means at which the EL is lightened.

3. An electroluminescence cell lighting device comprising;

a plurality of electroluminescence cells;

a single power supply for lighting said plurality of electroluminescence cells;

dynamic lighting means for dynamically connecting said plurality of electroluminescence cells to said single power supply in a time division manner;

EL luminescence brightness switching means for individually switching a luminescence level of each of said plurality of electroluminescence cells between a first and second level in accordance with said connecting of said cells to said power supply, said first and second levels being having a luminescence magnitude greater than zero.

* * * * *